Patented Jan. 11, 1949

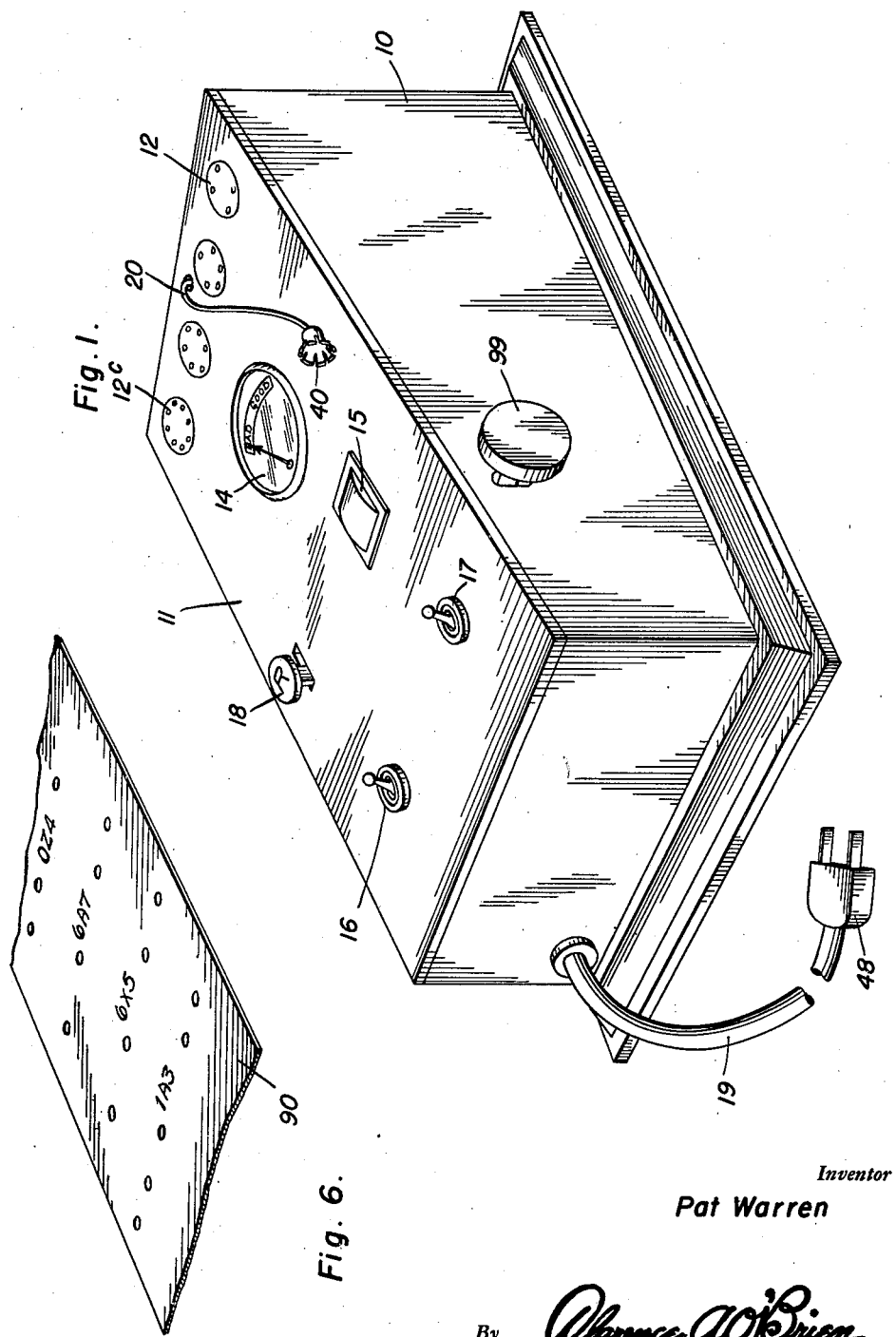

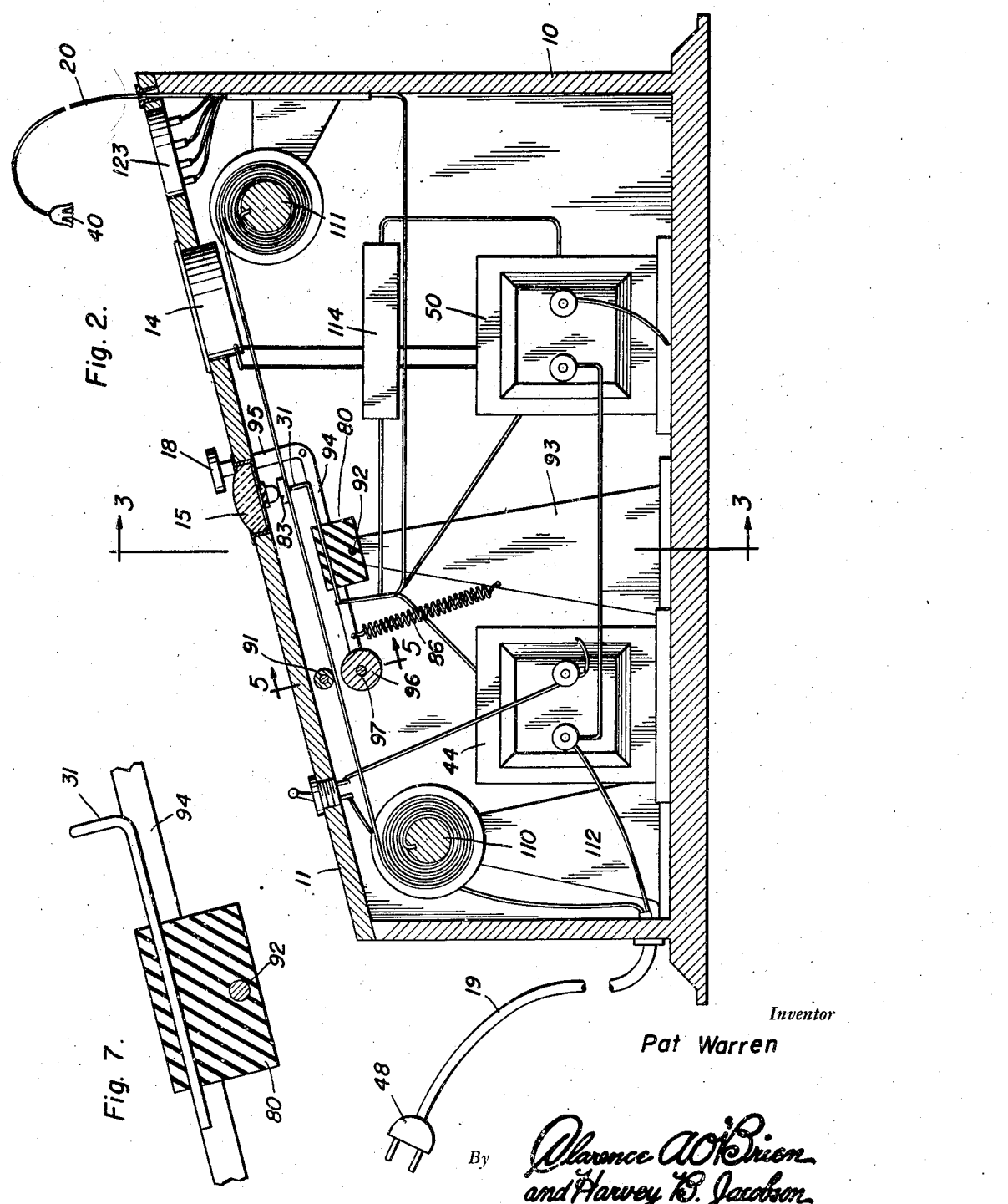

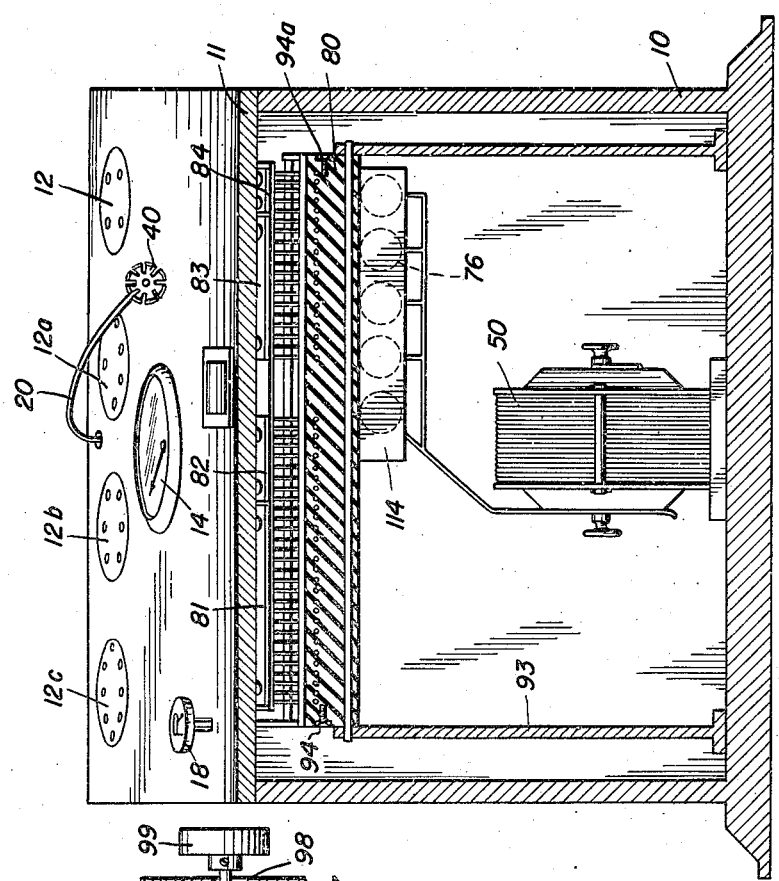
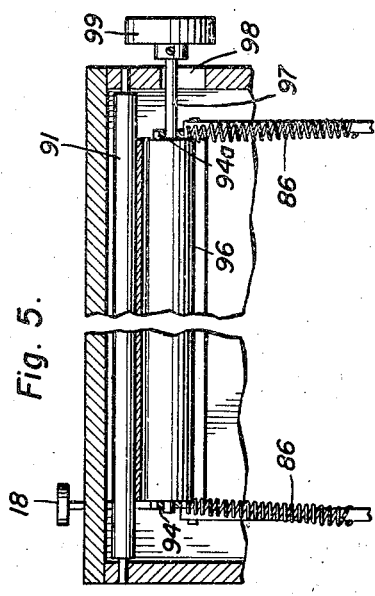

2,458,814

UNITED STATES PATENT OFFICE 2,458,814

TUBE TESTING APPARATUS

Pat Warren, Fort Worth, Tex.

Application August 8, 1947, Serial No. 767,373

16 Claims. (Cl. 315—368)

This invention relates to devises for testing electronic tubes and it has for its principal object to provide a simple, compact and efficient testing apparatus which may be constructed at little expense and which is ready to test the entire range of types of electronic tubes in use in connection with radio sets using merely simple mechanical manipulations and eliminating the necessity of a complex combination of adjustments requiring expert skill, experience and a high degree of attention.

It is a further object of the invention to provide a simple testing apparatus in which the testing circuits and their connections with sources of current with a plurality of outlets corresponding to different voltages and with the electrodes of the tubes, as well as connections with other elements, such as resistances, condensers and the like are all controlled by a large number of contact plungers, the effective operation of which is in its turn controlled by a perforated selector sheet, band or web.

It is a further object of the invention to provide an insulating selector sheet of the above mentioned type which is moved by hand and is provided with a large number of rows of perforations arranged along a transverse line on said sheet, which perforations permit the passage of selected resilient contacts arranged along a line substantially parallel to or coinciding with the aforesaid transverse line and the making of contact with contact plates arranged behind said sheet, while the imperforated portions prevent the making of contact between other contacts and the contact plate.

It is a further object of the invention to provide simple and effective means for establishing a good contact between the aforesaid contact plates and the contacts selected by the insulating selector sheet under test conditions, while removing said contacts from the sheet and contact plates during a longitudinal movement of the sheet, said two operations being performed simultaneously.

Still further objects of the invention will be apparent from the following detailed specification.

The invention is illustrated in the accompanying drawings. It is however to be understood that the embodiment of the invention shown in the drawings represents a simplified mode of applying the principles of the invention, selected in order to explain and illustrate clearly those principles, and their application by way of example. Those mechanical refinements which are customarily employed in connection with similar mechanical components have not been illustrated as they will be clear to the expert and no attempt is made to explain or illustrate the modifications of the mode of application which serve the same purpose or embody the same principles. Modifications of the simplified device illustrated are therefore not necessarily departures from the essence of the invention.

In the accompanying drawings,

Figure 1 is a perspective view of the tube testing device.

Figure 2 is an elevational sectional view of the tube testing device the section being taken along a broken line passing through the longitudinal median plane of the box and through that of the window and switch respectively.

Figure 3 is an elevational sectional view of the device, the section being taken along line 3—3 of Figure 2.

Figure 5 is an elevational sectional partial view of the device, the section being taken along line 5—5 of Figure 2.

Figure 6 is a perspective view of the test sheet.

Figure 7 is an elevational sectional view of the plunger support.

Figure 4:
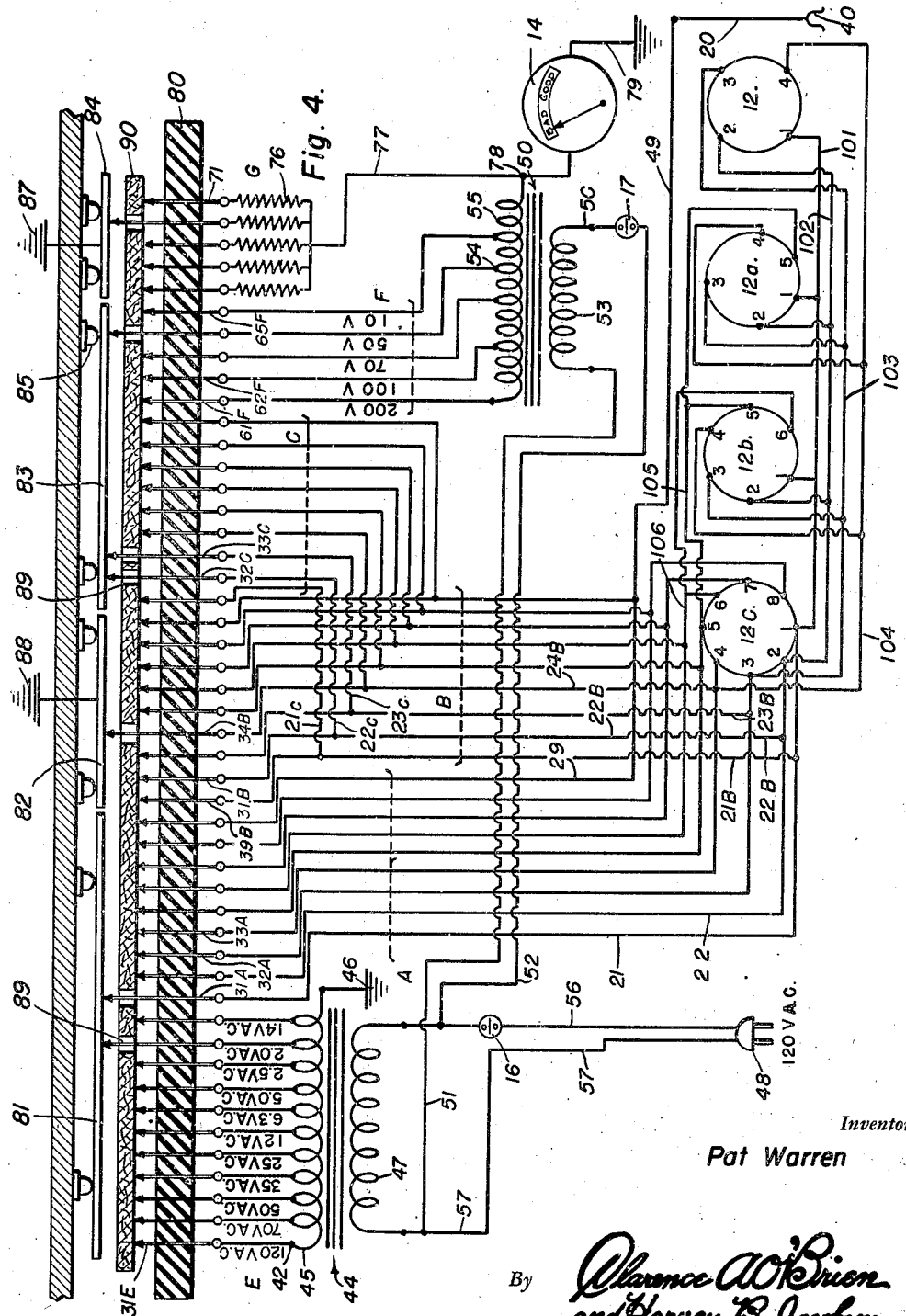
Figure 4 is a diagram of the connections between the operative parts.

The radio tube user interested in knowing the condition of the tubes applies one of a few simple tests indicating the condition of a tube. The simplest method usable for tubes of practically all types is the emission test and it will therefore be assumed in the following specification that the tube testing device is devised for applying the emission test. It is to be understood—as the invention is not directly connected with the test method itself—that this test method is described and illustrated as being representative of any known or customary test method selected to test electronic tubes.

When a definite test method such as the emission test method has been selected, it is necessary in testing tube after tube in accordance with this method to change or adapt the connections and to adjust the voltage, etc., and even the meters in accordance with the type of tube under test. As a rule the indicating meter is not calibrated, as it is used by persons not qualified to read instruments properly, but merely a range is indicated by color or inscription which classifies the tube tested as "good" or "bad" when reached by a pointer or finger. This type of instrument has only a narrow overall range and a change of voltage frequently entails the insertion of another resistance or a change of circuits. Therefore every new type of tube requires from three to four adjustments, and consumes time and attention. Moreover in order to make such a number of adjustments in a reliable fashion for every test, skill and experience are indispensable.

According to the invention the entire readjustment of the tester for a new type of electronic tube is automatically performed, when the operator shifts a movable sheet provided with the type numbers until the desired type number appears in a window. This operation automatically entails the necessary changes of connections and the operator has therefore merely to place the tube in one of the sockets and to press or move a switch handle. A conveniently placed meter of the above mentioned non-calibrated type then indicates whether the tube is in good condition.

The tube testing device according to the invention consists of an instrument box 10 with a slightly inclined upper panel 11 on which the meter 14 and the sockets 12, 12a, 12b, 12c for different types of tubes are mounted. This panel also carries a window 15 provided with markers, which may be covered by a magnifying glass plate and in which the type number of the tube to be tested appears. Moreover the panel carries two switches 16 and 17 and a button 18 the purpose of which is explained below.

The box 10 is moreover provided with a cord 19 adapted to be plugged into a suitable outlet connected with the source of current supply. On the upper end of the panel near the sockets a further cord 20 is arranged carrying a grid cap 40 for establishing connection with the grids of those tubes which have a separate grid outlet or grid connection at the top.

The internal arrangement of the testing device will be best seen in the diagram (Figure 4) which discloses the operative relationship without regard to size or correct relative position in space.

As seen in Figure 4 the sockets 12, 12a, 12b, 12c are provided with contacts marked 1, 2, 3, 4, 5, 6, 7, 8, and all the contacts which lead to electrodes performing the same function in the various types of sockets are connected by wires 101, 102, 103, 104, 105, 106. For instance, with the various types of sockets shown certain contacts (marked 1 and 4 in the diagram) are to be connected with the filaments of the tube, while others 2, 3 are to be connected with the grids, plates, etc., respectively.

Each conductor 101, 102 to 106 joining the interconnected contacts is connected with a contact plunger marked 31 to 38. The plungers are arranged in groups, four of which are indicated by dotted transverse lines. The first group A is formed in the example shown by nine plungers 31—39 designated by the reference letters 31A—39A. The plungers of the second group B are designated by 31B—39B, while the plungers of the third group C are designated by 31C to 39C. The plunger contacts in these groups are multiple contacts with each plunger (31A for example) of the group A connected (by lead 21B) with a corresponding plunger 31B of group B and (by means of lead 21C with a plunger (31C) of group C. These multiple contacts in their turn are connected by means of the wires 21—28 respectively to the conductors 101—108 joining corresponding socket contacts. The ninth plunger 39 in each group is connected by means of lead 29 with the cable 49 which leads to the cord 20 carrying the grip cap 40.

In addition to the three groups of contact plungers mentioned a further group E of plungers is provided which are connected with the tapping points 42 of a transformer 44 the secondary 45 of which may be grounded at 46 while the primary coil 47 is connected with the source of current supply (assumed to be an A. C. network) by conductors 56, 57 leading to plug 48. Conductors 56 and 57 form the cord 19 shown in Figure 1.

One of the conductors 46 embodies a switch 16 which is identical with the left switch shown in Figure 1.

The two leads 56, 57 are connected with branch leads 51 and 52 leading to the primary 53 of a second transformer 50. A switch 17 is inserted into the lead 52 to make transformer 50 operative. The secondary 55 of this transformer is tapped and the tapping points 54 are connected with a further group F of contact plungers 61F to 65F. A further group G of contact plungers 71 is connected with varying resistances 76 which are connected with a common conductor 77. This conductor is joined at 78 to the secondary coil 55 and to conductor 79 leading to the meter 14.

All the contact plungers of all the groups may be mounted on a common support 80 of Bakelite or of any other well known insulating material. In the diagram Figure 4 they are indicated as slidable for the sake of a clearer showing, but in fact they are preferably fixedly supported and are urged towards contact plates 81, 82, 83, 84 which are held in the box, and preferably on the inside of the panel 11, by means of insulators 85. Between the contact plates 81—84 and the contact plungers, however, an insulated sheet 90 is interposed which is provided with perforations 89 arranged along transverse lines. The plungers urged against the contact plates are therefore merely making contact with the insulating sheet 90 except at those points where a perforation 89 is located. At these points the plungers reach the contact plate and are therefore capable of establishing an electric contact with the same.

Two of the contact plates 82 and 84 are grounded (at 87, 88) the two others serve to establish connections between plungers.

The construction of the plungers and of their support 80 is shown in Figures 2 and 7. Each contact plunger 31 consists of an elastic contact rod, bent at right angle and fixedly inserted into and carried by the block 80 which runs transversely through the box. The carrier block 80 is mounted on axles 92 held by standards 93 mounted within the box. The end face of the carrier block carries a bar or rail 94 having a portion 95 bent at right angle which projects outwardly through the panel and is provided at this end with knob 18 shown in Figure 1. At the other end the rail or bar 94 carries an axle 97 supporting a roller 96, adapted to be applied against the perforated sheet 99. A second bar 94a arranged on the other end carries the other end of the axle 97. This axle projects outwardly through a slot 98 of the box and on its end carries a knob or thumb roller 99 which may be seized and turned by the operator. Springs 86 are attached to the bars 94 and 94a which normally urge the ends of the plungers against the sheet and the contact plate. A second roller 91 is fixedly supported within the box and is applied against the perforated sheet 90.

The perforated type selector sheet 90 consists of a web of insulating material, such as paper, an impregnated or rubberized fabric or the like either provided with small metallic bodies or having perforations 89 arranged along transverse lines which also carry the type number as shown in Figure 6. The plungers may be arranged in one row, as shown, or in a plurality of rows, the latter arrangement being preferable for the testing of dual tubes with a multiple function. In this case the perforations associated with one type are also arranged in a plurality of parallel transverse lines, the type number being always connected and inscribed at a place which will appear in the window 15 between markers when the rows of perforations are aligned and coincident with the rows of plungers.

The perforated type selector sheet 90 may be wound on spools or rollers 110, 111, preferably provided with the customary frictional and spring means (not shown) for holding the sheet extended between them. These spools or rollers are supported in the box 10 or on separate standards 112. The sheet may also adopt the form of an endless band.

The contact plates 81, 82, 83, 84 are applied against the upper part of the sheet 90 and are so spaced, as shown in Figure 3, that a strip of the sheet 90 on which the type numbers are inscribed is continuously visible through the window 15.

The box in addition contains the transformers 44, 50, the box 114 containing the resistances 76 and all other components above mentioned.

The invention will be best understood by describing the operation in a specific case and the connections established during such operation.

Let it be assumed that a tube say of the type 2A3 (amplifier triode) has to be checked. The operator in this case presses button 18 with one hand and turns knob 99 with the other hand, until the type number 2A3 appears in the window 15. When button 18 is pressed the block 80 is turned around its axis 92 and the plungers 31 are removed from the type selector sheet 90. Simultaneously the roller 96 is applied against the sheet, which is gripped between said roller and roller 91. When knob 99 is rotated the sheet is thereby advanced and unwound from one spool and wound on the other.

When the type number 2A3 appears in the window, preferably between markers fixing its exact location, the button 18 is again released, the spring 86 retracts the bar 94 and moves the block in a counter-clockwise direction (Figures 2 and 7).

The ends of the pistons 31 now are all aligned with the transverse line carrying the perforations and those plungers which face perforations will therefore come into contact with the contact plates 81 to 84 behind the sheet. The other plungers rest on the insulating sheet. The spring is so selected that it slightly bends the elastic plunger rods so that good contact is obtained.

The tube to be tested is now inserted into the socket which in the case of a tube 2A3 is the socket 12. In this tube the filament is connected with the contacts 1 and 4 of the socket while the plate is connected with contact 2 and the grid with contact 3. The filament is to be connected with a grounded 2V source of current on one side and with the ground on the other side.

Accordingly a perforation 89 is provided in the sheet opposite the tenth plunger contact of group E which is connected with a tapping point of the coil 45 corresponding to 2 volts. Moreover a perforation 89 is located opposite plunger 31A of group A and another perforation is located opposite the plunger 34B of group B. These three perforations permit the plungers to make the connections for the filament circuit. This circuit is now closed from ground 46 over the tenth plunger of group E (2 volt tap) to contact plate 81 and from that plate to plunger 31A of group A and from there over line 21 and 101 to contact 1 of socket 12, into which the tube 2A3 has been inserted, then through the filament of the tube, the contact 4 of the socket, the line 104, 24B the piston contact 34B, and the grounded contact plate 82 to ground 88 As soon as switch 16 is pressed the secondary coil 45 is energized and a current flows through the filament in the above described circuit.

For the emission test the plate and the grids and other electrodes (if any) have to be connected and a low voltage has to be applied to the plate while the meter is read. On the transverse line of the type selector sheet facing the contact plunger, further perforations have in this case been made opposite piston 32C, connected with the plate socket contact 2 over lead 22C, 22B and 102, and opposite piston 33C, connected with the grid socket contact 3 over 23C, 23B and 103. Moreover a further perforation is made for piston 64F of group F which leads to the 50 volt tapping of secondary coil 55. In this way a voltage of 50 volt is applied from ground on line 79 over meter 14, secondary coil 55, the second tapping 54 from the right in Figure 4 of this coil, to piston 64, contact plate 83 and both the plate and grid circuits as above mentioned. When switch 17 is operated the secondary 55 is energized and the meter 14, therefore, indicates the emission. The tube may be classified as being in good or bad condition in the customary way according to the meter reading.

In order to be able to use the same meter with different voltages the circuit 77, connected with the resistances 76, is provided. It permits to insert resistances of different selected values in parallel to the meter.

For the voltage of 50 volt it is assumed that the correct value is the second resistance from the right in Figure 4 and therefore the piston 71G of group G projects through a perforation and makes contact with contact plate 84 thus closing the parallel circuit 77 to the meter through resistance 71G to ground 87.

In order to test an electronic tube of a definite type the operator has therefore to press button 18 and to turn knob 99 until the type number of the tube to be tested appears in window 15; he then inserts the tube into that socket 12, 12a, 12b, 12c which fits this type tube. He first presses switch 16 and then presses switch 17 observing the meter during the latter operation. The meter reading being a function of the emission will classify automatically the condition of the tube as "good" or "bad."

With the exception of the adjustment necessary to bring the type number into the window no operation requires much attention and none requires expert skill. The testing can therefore be performed speedily and does not require skilled or experienced electricians.

The above example is limited to a definite test of a definite type, but it will be clear to the expert that the nature of the test depends merely on the nature and location of the perforations and in some cases on the number of groups of contact plungers formed. For the basic requirement for each test is merely to connect electrodes or other elements of the tubes either with other electrodes or with sources of current of a definite voltage or with resistances and similar elements. Examples of all these connections effected by means of suitable contact plates have been shown.

It will also be clear that the constructional details which have been simplified as far as possible for the sake of explanation may be changed or modified without affecting the essence of the invention.

Having described the invention, what is claimed as new is:

1. In an apparatus for testing electronic tubes, a panel provided with a number of sockets having socket contacts, a source of currents, a meter, groups of contact plungers connected with the socket contacts, a group of contact plungers connected with the source of current, a further group of contact plungers connected with the meter, a number of contact plates facing said contact plungers, means for pressing said plungers towards said plates, a movable insulating type selector sheet provided with perforations interposed between said contact plungers and contact plates, providing for contact between the aforesaid plungers and plates through the perforations, thus establishing the test connections between electrodes and between electrodes, the source of current and the meter respectively.

2. In an apparatus for testing electronic tubes, a panel provided with a number of tube sockets with socket contacts connected in multiple, a meter on said panel, means for establishing connections with a source of current with outlets providing circuits of different voltages, a plurality of groups of contact plungers, with plungers connected in multiple, and further connected with the socket contacts connected in multiple, further groups of contact plungers connected with the outlets of the source of current having different voltages, contact plates facing said contact plungers and in operative contact position with respect to the same, means for pressing the contact plungers of all groups towards the contact plates, a movable insulating type selector sheet with perforations interposed between said contact plates and plungers for preventing and providing operative contacts, the established contacts closing the test circuits between the electrodes and between the latter, the source of current and the meter.

3. In an apparatus for testing electronic tubes, a panel provided with a number of sockets having socket contacts, a source of currents, a meter, groups of contact plungers connected with the socket contacts, a group of contact plungers connected with the source of current, a further group of contact plungers connected with the meter, a further group of contact plungers connected with resistances of different value, a number of contact plates facing said contact plungers, means for pressing said plungers toward said plates, a movable insulating type selector sheet provided with perforations interposed between said contact plungers and contact plates, providing for contact between the aforesaid plungers and plates through the perforations, thus closing the test circuits including electrodes, and including the source of current, the meter and the required resistances respectively.

4. In an apparatus for testing electronic tubes, a panel provided with a number of tube sockets with socket contacts, connected in multiple, a meter on said panel, means for establishing connections with a source of current with outlets providing circuits of different voltages, a plurality of groups of contact plungers, with plungers connected in multiple, and further connected with the socket contacts connected in multiple, further groups of contact plungers connected with the outlets of the source of current having different voltages, one of said groups being connected with the outlets of the source of current and with a common conductor including the meter, contact plates facing said contact plungers and in operative contact position with respect to the same, means for pressing the contact plungers of all groups towards the contact plates, a movable insulating type selector sheet with perforations interposed between said contact plates and plungers for preventing and providing operative contacts, the established contacts closing the test circuits between the electrodes and between the latter, the source of current and the meter.

5. In an apparatus for testing electronic tubes, a panel provided with a number of tube sockets, with socket contacts connected in multiple, a meter on said panel, means for establishing connections with a source of current with outlets providing circuits of different voltages, a plurality of groups of contact plungers, with plungers connected in multiple, and further connected with the socket contacts connected in multiple, further groups of contact plungers connected with the outlets of the source of current having different voltages, contact plates facing contact plungers of a group connected with the outlets of the source of current and at least a portion of a group of plungers connected with the socket contacts, further contact plates connected with current return means; at least one of said contact plates facing a group of contact plungers connected with socket contacts, means for pressing the contact plungers of all groups towards the contact plates, a movable insulating type selector sheet with perforations, interposed between said contact plates and plungers for preventing and producing operative contacts between the said plates and plungers, the established contacts closing the test circuits between electrodes, and between electrodes, the source of current and the meter.

6. In an apparatus for testing electronic tubes, a box and a panel mounted thereon, a number of tube sockets mounted on said panel, a meter on said panel, a source of current with a plurality of outlets furnishing currents with different voltages, a number of aligned contact plungers within said box connected with the outlets of said source of current and with the tube sockets respectively, contact plates within said box facing said contact plungers, means for pressing said contact plungers against said contact sheets and an insulating type selector sheet, arranged within and movable along said box interposed between said contact plates and plungers, means for moving said sheet in a direction at right angle to the aligned contact plungers, said sheet being provided with perforations, to prevent and produce contact of the plungers with the contact plate, the perforations for the testing of one type of tube being arranged along a line running transversely on said sheet, at right angle to the direction of movement of the same.

7. In an apparatus for testing electronic tubes, a box, a panel mounted thereon, a number of tube sockets with socket contacts, and a meter, mounted on said panel, a source of current with a plurality of outlets for currents supplied at different voltages, a number of contact plungers, with their ends aligned, consisting of resilient contact rods with a bent end portion, an insulating elongated support, carrying said contact rods, mounted rotatably within the box, and spring means for keeping said support under tension, elongated contact plates facing the row of aligned ends of the contact plungers, the said contact plungers being connected with one of the socket contacts and with one of the outlets of the source of current respectively, an insulated movable type selector sheet provided with perforations interposed between said contact pistons and said contact plates, said spring means urging the contact plungers against said perforated sheet and contact plates so as to produce contact between the latter and plungers through the perforations, while slightly deforming the resilient contact rods resting on the sheet.

8. In an apparatus for testing electronic tubes, a box, a panel mounted thereon, a number of tube sockets with socket contacts, and a meter, mounted on said panel, a source of current with a plurality of outlets for currents supplied at different voltages, a number of contact plungers, with their ends aligned, consisting of resilient contact rods with a bent end portion, an insulating elongated support, carrying said contact rods, mounted rotatably within the box, and spring means for keeping said support under tension, elongated contact plates facing the row of aligned ends of the contact plungers, the said contact plungers being connected with one of the socket contacts and with one of the outlets of the source of current respectively, an insulated movable type selector sheet provided with perforations, interposed between said contact pistons and said contact plates, said spring means urging the contact plungers against said perforated sheet, means for moving said perforated sheet, and a hand operated lever fixedly connected with the support of the contact plungers, for removing the ends of the plungers from the perforated sheet during the movement of the same.

9. In an apparatus for testing electronic tubes, a box, a panel mounted thereon, a number of tube sockets with socket contacts, and a meter, mounted on said panel, a source of current with a plurality of outlets for currents supplied at different voltages, a number of contact plungers, with their ends aligned, consisting of resilient contact rods with a bent end portion, an insulating elongated support, carrying said contact rods, mounted rotatably within the box, and spring means for keeping said support under tension, elongated contact plates facing the row of aligned ends of the contact plungers, the said contact plungers being connected with one of the socket contacts and with one of the outlets of the source of current respectively, an insulated movable type selector sheet provided with perforations interposed between said contact pistons and said contact plates, said spring means urging the contact plungers against said perforated sheet, means for moving said perforated sheet including a bracket attached to said rotatable support, a roller carried by said bracket, a roller in contact with said perforated sheet mounted fixedly in the box, and a hand lever attached to said rotatable support, provided with button projecting through said panel, for removing the ends of the plungers from the sheet and simultaneously applying the roller carried by the support against said sheet.

10. An apparatus for testing electronic tubes as claimed in claim 1, comprising a cable provided with a grid cap, adapted for connections with electrodes of tubes arranged on the glass bulb of the same and passing through the panel, and at least one contact plunger, added to the group of plungers connected with the socket contacts, connected with said cable.

11. In an apparatus for testing electronic tubes, a panel with a number of tube sockets each socket being provided with contacts, test circuit sections each connected at least with one of said socket contacts, each circuit section ending in a plunger contact, further test circuit sections adapted to complete the first named sections, said further circuit sections being connected with a common branch section, a meter in said branch section, contact plates for establishing a selective contact between the plunger contacts of the first named test circuit section and the further completing test circuit sections, and an insulating sheet provided with means for producing contact at selected points for establishing contact between selected plungers and the said contact plates.

12. In an apparatus for testing electronic tubes, sources of current, a panel with a number of tube sockets, each socket being provided with contacts, test circuit sections each connected at least with one of said socket contacts, each circuit ending in a plunger contact, and all plunger contacts being aligned to form a row of contacts, further test circuit sections adapted to complete the first named test circuit sections, including a group of such sections connected with said sources of current, and including a further group connected with said sources of current and with a common branch section, a meter in said branch section, contact plates for selectively establishing the contact plunger of the first named test circuit sections and the further test circuit sections, and a movable insulating sheet adapted to establish a contact between selected plungers and the said contact plates along transverse lines, for establishing varying connections between the first named test circuit sections, the further sections and the meter.

13. In an apparatus for testing electronic tubes, a panel provided with a number of tube sockets with socket contacts, connected in multiple, a meter on said panel, means for establishing connections with a source of current with outlets providing circuits of different voltages, a plurality of groups of contact plungers, with plungers connected in multiple, and further connected with the socket contacts connected in multiple, further groups of contact plungers connected with the outlets of the source of current having different voltages, one of said groups being connected with the outlets of the source of current and with a common conductor including the meter, contact plates facing the contact plungers and in operative contact position with respect to the same, a further group of contact plungers connected with resistances of different value, joined to a common conductor, and facing a contact plate connected with a return conductor, to form a number of circuits, said circuits being connected in parallel with the meter, means for pressing the contact plungers of all the groups toward the contact plates, a movable insulating type selector sheet with perforations interposed between said contact plates and plungers for preventing and providing operative contacts, the established contacts closing the test circuits between the electrodes and between the latter, the source of current and the meter.

14. In an apparatus for testing electronic tubes, a panel with a number of tube sockets, each socket being provided with socket contacts, a number of test circuit sections, each connected with at least one of the socket contacts and further connected with a contact plunger, a number of further test circuit sections adapted to complete the first section, a meter within said branch, sources of current connected with said further sections, means including contact plates for selectively establishing a connection between the first-named test circuit sections and the said further sections connected with the meter, and an elongated insulating longitudinally movable sheet provided with contact establishing means arranged along transverse lines, each line establishing contact between selected plungers and the contact plates.

15. In an apparatus for testing electrode tubes, a panel with a number of tube sockets, each socket being provided with socket contacts, a number of test circuit sections, each connected with at least one of the socket contacts and further connected with a contact plunger, a number of further test circuit sections adapted to complete the first named sections, said further sections having a common branch section, a meter within said branch, sources of current connected with said further sections, means including contact plates for selectively establishing a connection between the first-named test circuit sections and the said further sections connected with the meter, an elongated insulating longitudinally movable sheet provided with metallic contacts arranged along transverse lines, each line establishing contact between selected plungers and the contact plates.

16. In an apparatus for testing electronic tubes, a panel with a number of tube sockets, each socket being provided with socket contacts, a number of test circuit sections, each connected with at least one of the socket contacts and further connected with a contact plunger, a number of further test circuit sections adapted to complete the first named sections, said further sections having a common branch section, a meter within said branch, sources of current connected with said further sections, means including contact plates for selectively establishing a connection between the first-named test circuit sections and the said further sections connected with the meter, and an elongated insulating longitudinally movable sheet provided with perforations arranged along tranverse lines for producing contact between selected contact plungers and the contact plates.

PAT WARREN.

REFERENCES CITED

The following references are of record in the file of this patent:

UNITED STATES PATENTS

| Number | Name | Date |
|---|---|---|
| 2,198,242 | Buchard | Apr. 23, 1940 |
| 2,264,066 | Buchard | Nov. 25, 1941 |